(12) United States Patent
Iino et al.

(10) Patent No.: US 6,573,636 B1
(45) Date of Patent: Jun. 3, 2003

(54) ULTRASONIC MOTOR HAVING SINGLE BOOSTER CIRCUIT AND ELECTRONIC DEVICE WITH ULTRASONIC MOTOR

(75) Inventors: Akihiro Iino, Chiba (JP); Kenji Suzuki, Chiba (JP); Kouji Nitadori, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/714,697

(22) Filed: Nov. 16, 2000

(30) Foreign Application Priority Data

Nov. 26, 1999 (JP) ............................ 11-336061
Oct. 19, 2000 (JP) ........................... 2000-319792

(51) Int. Cl.⁷ .................. H01L 41/06; H01L 41/08; H01L 41/04; H01L 41/18; H02N 2/00
(52) U.S. Cl. .................. 310/316.01; 310/317; 310/318
(58) Field of Search ............... 310/316.01, 316.02, 310/317, 318

(56) References Cited

U.S. PATENT DOCUMENTS

| | | | | |
|---|---|---|---|---|
| 4,529,322 A | * | 7/1985 | Ueda | 368/255 |
| 5,093,606 A | | 3/1992 | Adachi et al. | 318/116 |
| 5,101,144 A | * | 3/1992 | Hirotomi | 318/116 |
| 5,365,139 A | * | 11/1994 | Kasuga et al. | 310/316 |
| 5,461,273 A | * | 10/1995 | Kawasaki et al. | 310/316 |
| 5,592,041 A | * | 1/1997 | Kasuga et al. | 310/316 |
| 5,619,089 A | * | 4/1997 | Suzuki et al. | 310/323 |
| 5,675,484 A | * | 10/1997 | Shimada | 363/71 |
| 5,739,622 A | * | 4/1998 | Ziatsu | 310/316 |
| 5,740,132 A | * | 4/1998 | Ohshima et al. | 368/204 |
| 5,777,232 A | * | 7/1998 | Kurita et al. | 73/664 |
| 5,780,955 A | * | 7/1998 | Iino et al. | 310/316 |
| 5,859,489 A | * | 1/1999 | Shimada | 310/318 |
| 5,920,144 A | * | 7/1999 | Atsuta | 310/316 |
| 6,064,138 A | * | 5/2000 | Iino et al. | 310/316.01 |
| 6,133,672 A | * | 10/2000 | Sasaki et al. | 310/318 |
| 6,151,232 A | * | 11/2000 | Furuhashi et al. | 363/97 |
| 6,163,141 A | * | 12/2000 | Yoshida et al. | 323/266 |
| 6,316,714 B1 | * | 11/2001 | Kotanagi et al. | 136/242 |
| 6,362,611 B1 | * | 3/2002 | Utsunomiya | 323/282 |
| 6,429,987 B1 | * | 8/2002 | Cheng | 360/46 |
| 6,459,658 B1 | * | 10/2002 | Fujita et al. | 368/203 |
| 6,469,417 B2 | * | 10/2002 | Shibatani | 310/316.01 |
| 6,476,542 B2 | * | 11/2002 | Phillips | 310/359 |
| 6,483,226 B1 | * | 11/2002 | Okada | 310/328 |
| 6,486,743 B2 | * | 11/2002 | Hasegawa et al. | 331/25 |

FOREIGN PATENT DOCUMENTS

| | | | | |
|---|---|---|---|---|
| EP | 0767504 | | 4/1997 | |
| EP | 0940863 | | 9/1999 | |
| EP | 1104085 A2 | * | 5/2001 | H02N/2/00 |
| JP | 9163769 | | 6/1997 | |

* cited by examiner

Primary Examiner—Nestor Ramirez
Assistant Examiner—Pedro J. Cuevas
(74) Attorney, Agent, or Firm—Adams & Wilks

(57) ABSTRACT

Pluralities of electrode groups are formed on one face of a piezoelectric element, and a common electrode is formed on another face. The common electrode is connected to a booster circuit for boosting a voltage signal obtained from an amplifier circuit. The pluralities of electrode groups are connected to selection circuits for switching a signal path of a signal output from here.

18 Claims, 11 Drawing Sheets

ULTRASONIC MOTOR HAVING SINGLE BOOSTER CIRCUIT AND ELECTRONIC DEVICE WITH ULTRASONIC MOTOR

BACKGROUND OF THE INVENTION

1. Field of the Invention

The present invention relates to an ultrasonic motor and an electronic device using the ultrasonic motor, and in particular, relates to an ultrasonic motor using a self-exciting oscillator circuit in a driver circuit of the ultrasonic motor, and to an electronic device using the ultrasonic motor.

2. Description of the Prior Art

Research and development of self-excited oscillator circuits capable of being realized by a small number of parts and having a simple structure, and in their application to small-sized electronic devices, has occurred in recent years. For example, this type of self-exciting oscillator circuit is disclosed in Japanese Patent Application Laid-open No. Hei 9-163769.

A signal amplified by the amplifier circuit is input to the booster circuit through the phase setting circuit and the and the phase regulating circuit. The signal boosted by the booster circuit is applied to an electrode of a piezoelectric element, and the piezoelectric element is excitation driven. A driving signal based on the oscillation of the piezoelectric element is fed back to the amplifier circuit and the piezoelectric element performs self-excited oscillation. As a result, a vibrating member joined to the piezoelectric element vibrates, and a moving member resiliently contacting the vibrating member under a predetermined pressure applied by pressurization means, rotates.

The stop signal generation circuit is a circuit for controlling the operation of the amplifier circuit, and therefore the amplifier circuit stops outputting in accordance with a stop signal. The piezoelectric element stops self-excited vibration, and therefore it becomes possible to arbitrarily stop the rotation of the moving member.

However, when applying a signal generated by the booster circuit to electrode groups formed on a surface of the piezoelectric element in a self-excited oscillator circuit utilizing a conventional booster circuit, the direction of rotation is limited in one direction in order for the signal to be applied to only one electrode group. There is a problem, therefore, in that the ultrasonic motor cannot apply to uses requiring forward and reverse operation by controlling a set position of the ultrasonic motor, such as the opening and closing of a shutter and determining the position of a disc.

An object of the present invention is to obtain an ultrasonic motor which is driven by a self-excited oscillator circuit with a booster circuit which is capable of controlling forward and reverse operation in accordance with an external signal, or an electronic device having an ultrasonic motor to solve the conventional problems.

SUMMARY OF THE INVENTION

In order to solve the above stated problem, the present invention is structured by an ultrasonic motor composed of a vibrating member having a piezoelectric element and an amplifying circuit and structures an oscillator circuit for self-excited oscillation of the vibrating member at a predetermined resonance mode, and which drives a moving member by an oscillatory wave generated in the vibrating member, and includes a booster circuit for boosting an electric voltage generated by an amplifier circuit, and outputting a signal to a common electrode formed on one face of the piezoelectric element, and a selection circuit for switching a signal path of a booster signal output from a plurality of electrode groups formed on another face of the piezoelectric element.

In accordance with this, by outputting the signal generated by the booster circuit to the common electrode formed on one face of the piezoelectric element, and by connecting the selection circuit for selecting a rotational direction in the plurality of electrode groups formed in the other side of the piezoelectric element, it becomes possible to control forward and reverse rotational directions by one set of booster circuits. The increase of the number of parts can be suppressed, and an ultrasonic motor having a good efficiency self-exciting oscillation circuit which can supply a booster voltage obtained from the booster circuit to the piezoelectric element as is, without reduction, and an electronic device having the ultrasonic motor, and realizing a forward and reverse capable self-excited oscillator circuit using the booster circuit, along with forming the selection circuit in the electrode side which is not connected to the booster circuit.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
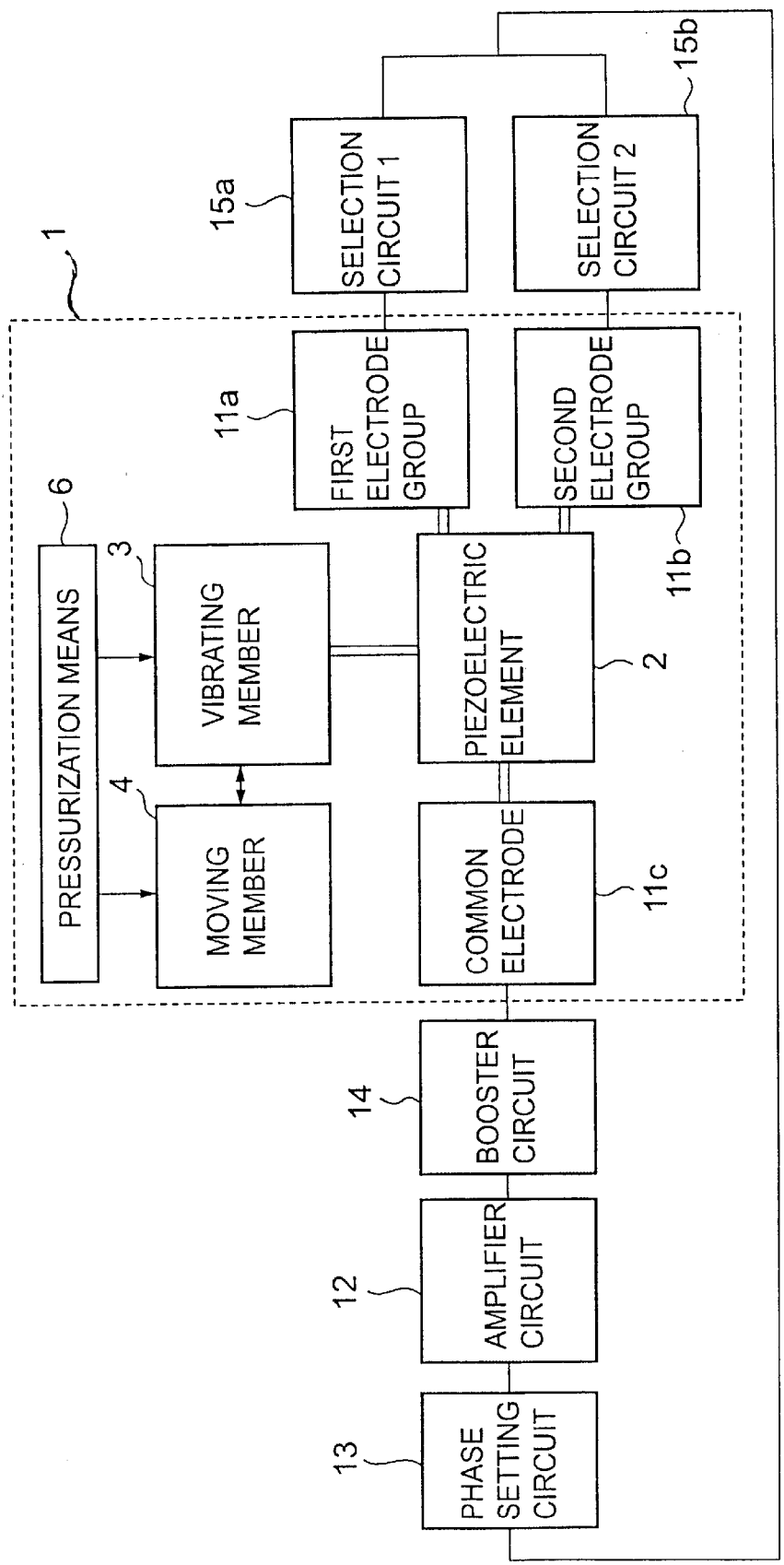
FIG. 1 shows a circuit block diagram of embodiment 1 of the ultrasonic motor of the present invention.

Embodiments, which apply the present invention, are explained in detail with reference to the figures.

Embodiment 1

First, the principle and the structure of an ultrasonic motor capable of applying the present invention are explained.

An ultrasonic motor 1 is structured by a vibrating member 3 having at least a piezoelectric element 2, a moving member 4 driven by a vibration of the vibrating member 3, and a pressurization means 6 for applying pressure to the vibrating member 3 and a moving member 4.

Figure 2:
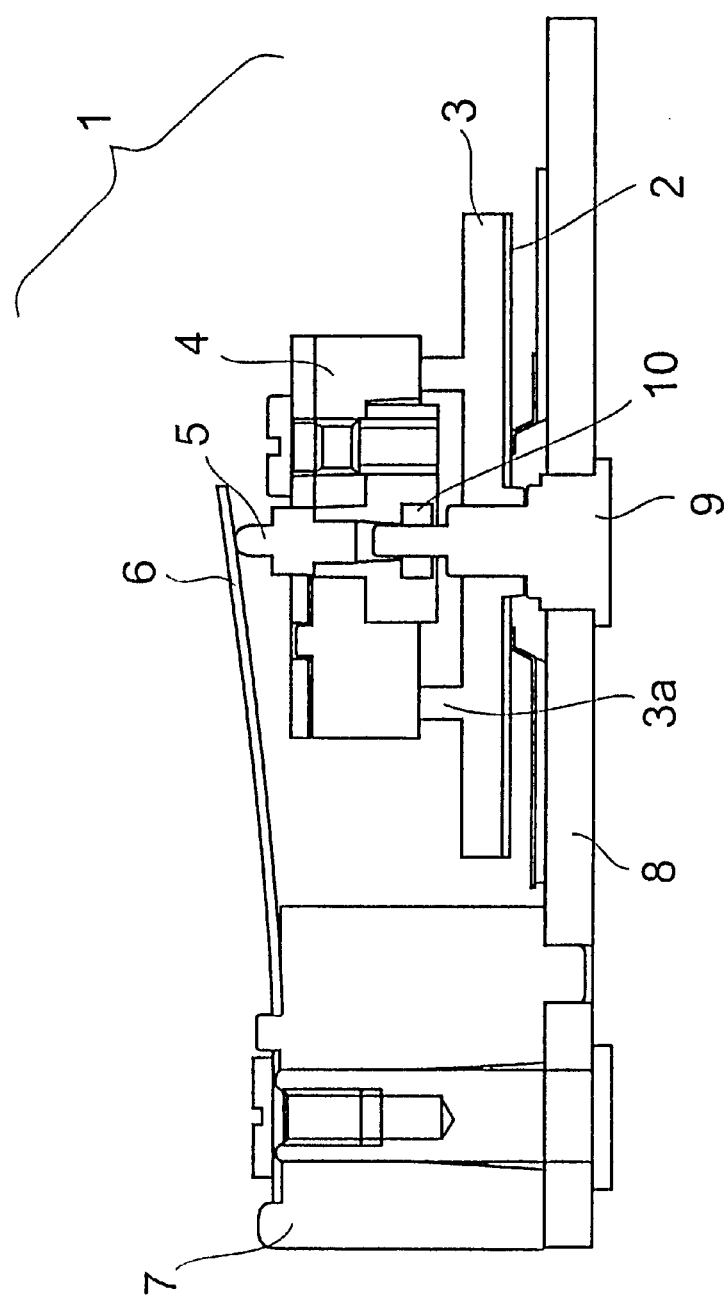
FIG. 2 shows a cross sectional diagram of the ultrasonic motor of the present invention.

A cross sectional diagram of the ultrasonic motor 1 of the present invention is shown in FIG. 2. The ultrasonic motor 1 is supported by a center shaft 9 fixed to a support plate 8 in the center of the disk shape vibrating member 3, and the piezoelectric element 2 is joined to one side of the vibrating member 3, while a projection 3a for stimulating expanded displacement of the vibrating member 3 is formed on another side. A bearing 10 is formed in the center of the moving body 4, and is guided by a center shaft 9. By applying pressure to a pivot 5 formed on a top face of the moving body 4 by a control spring 6 fixed to a pedestal 7, an appropriate amount of friction force is applied between a sliding surface of the moving member 4 and the projection 3a of the vibrating member 3.

A diagram for explaining the operating principle of the ultrasonic motor 1 is shown in FIG. 3. The piezoelectric element 2 joined to the vibrating member 3 is divided into one quarter wavelengths in the circumferential direction as shown in FIG. 3A, and polarization processing is performed in the thickness direction so that the polarization direction is reversed each division. Each electrode pattern forms two electrode groups of a first electrode group (shaded portion) 11a and a second electrode group (non-shaded portion) 11b. As shown in FIG. 3B, the projection 3a of the vibrating member 3 is joined so as to be positioned in the boundary of the electrode pattern with the piezoelectric element 2 on which the electrodes are implemented. A common electrode 11c is formed over the entire surface on which the vibrating member 3 is joined. If a signal having a predetermined frequency is applied to the first electrode group 11a, then a standing wave such as that of FIG. 3C is generated in the vibrating member 3. Specifically, for example, a vibration mode having three waves in the circumferential direction, and one node in the radial direction is excited. The raised projection 3a tilts to the right at this time, and therefore the moving member 4 moves to the right. If a signal is applied to the second electrode group 11b, then a standing wave such as that of FIG. 3D is generated, the raised projection 3a tilts to the left and the moving member 4 moves left. Thus by placing the projections 3a of the vibrating member 3 in between the peaks and the nodes of the standing wave, and by selecting the electrode group for applying the signal having the predetermined driving frequency, it is possible to switch the moving member 4 between forward and reverse motion.

The above is an explanation of an ultrasonic motor 1 applicable to the present invention as shown in a structure of FIG. 2 and in a principle shown in FIG. 3, but the present invention is not limited thereto.

Figure 4:
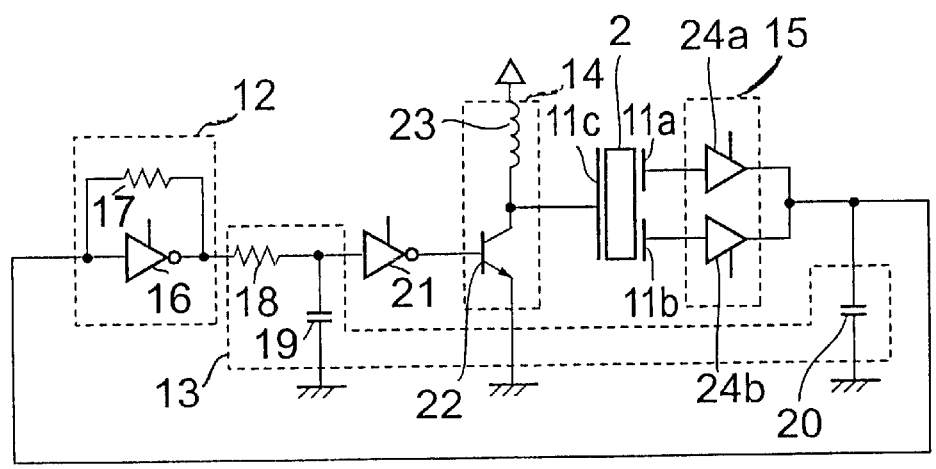
FIG. 4 shows a specific circuit structure of embodiment 1 of the ultrasonic motor of the present invention.

FIG. 1 shows a circuit block diagram of a self-excited circuit of embodiment 1 of the present invention, and is structured by the ultrasonic motor 1, an amplifier 12, a phase setting circuit 13, a booster circuit 14, and a selection circuit comprised of a selection circuit 1 15a and a selection circuit 2 15b. Further, a specific circuit diagram is shown in FIG. 4.

The amplifier circuit 12 is structured by an inverter 16 and a resistor 17, and performs inverted amplification of a signal. A signal from the selection circuit 15, which selects a signal generated by the vibrating member 3, is input to an input of the inverter 16. The output voltage of the inverter 16 determines the inverted amplifying operating point of the inverter 16 in accordance with the feedback resistor 17 connecting the output to the input of the inverter 16, an AC signal centered on VDD/2 is amplified, and is input to the phase setting circuit 13. The inverter 16 uses a three state structure IC, and performs starting and stopping of the self-excited oscillator circuit in accordance with a control signal.

The phase setting circuit 13 is structured by a resistor 18, and two capacitors 19 and 20, and unneeded frequency components generated by the vibrating body 3 are cut, predetermined frequency components which drive the vibrating member 3 are extracted, and phase of the same signal is set. Similarly, the inverter 21 also regulates the phase of the self-excited oscillator circuit, along with amplifying the signal reduced by the phase setting circuit 13, performs inverted amplification of the signal passed through the phase setting circuit 13, and outputs to the base of a transistor 22.

The transistor 22 and a booster coil 23 structure the booster circuit 14, and perform inversion boosting of the signal amplified by the inverter 21. The emitter of the transistor 22 is connected to ground, and the collector is electrically connected to the booster coil 23 and the vibrating body 3, namely to the common electrode 11c of the piezoelectric element 2.

Figure 3A:
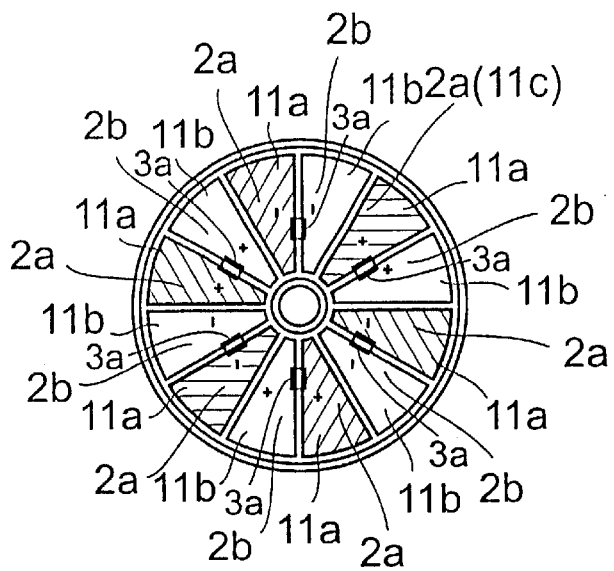
FIG. 3 are diagrams showing an operation principle of the ultrasonic motor of the present invention.
Figure 3B:
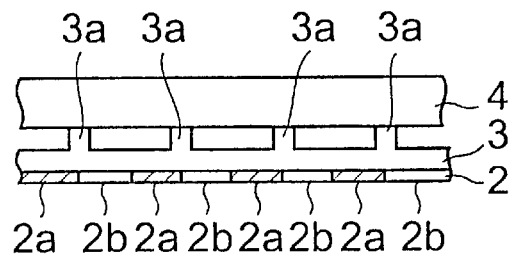
Figure 3C:
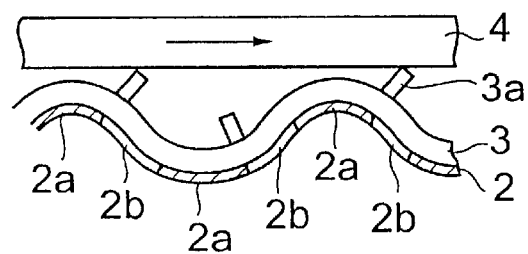
Figure 3D:
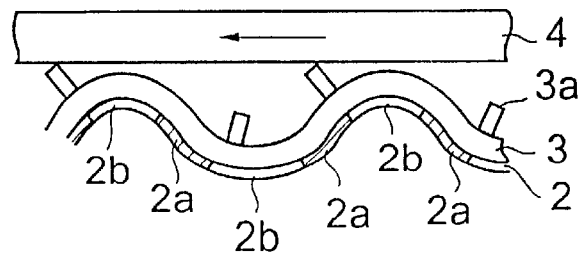

One set of the electrode groups 11a and 11b composed of a plurality of electrodes is formed on one face of the piezoelectric element 2, as shown in FIG. 3A, and the common electrode 11c is formed across the entire surface of the other face. The vibrating member 3 also fulfills a role as an electrode, the signal boosted by the booster circuit 14 has conduction to the common electrode 11c through the vibrating member 3, and the signal is input to the selection circuit 15 from the electrode groups 11a and 11b composed of the plurality of electrodes.

The value of the boosted voltage can be made several times the voltage of the electric power supply voltage by appropriately selecting the booster coil 23, and the piezoelectric element 2 can be excited and driven. Therefore, even if the electric power supply has a low voltage of 1.5 V, it is stable and the ultrasonic motor 1 can be driven at high output.

The selection circuit 15 is structured by, for example, one set of buffers 24a and 24b. The buffers 24a and 24b have a three state structure, and whether in an active state or an inactive state is determined by an external signal. The first electrode group 11a and the second electrode group 11b of the piezoelectric element 2 are independently connected to the input of the buffers 24a and 24b, respectively. By selecting which buffer to place in the active state by the external signal, the electrode group to which a drive signal is applied is selected, and forward and reverse operation of the moving body 4 is switched.

The amplified buffer output signal is fed back to the amplifier circuit 12 via the phase setting capacitor 20.

In the self-excited oscillation circuit, noise having many frequency components is generated when the electric power supply is connected, and unnecessary frequency components are cut by the resonance circuit composed of the ultrasonic motor 1, the resistor 18, and the capacitors 19 and 20, and a signal with a specific frequency is selected. The main component of the specific frequency generated in the oscillating member 3 is fed back by the amplifier circuit 12, the phase setting circuit 13, and the booster circuit 14, the inverted and boosted drive signal is interrupted, and self-excited oscillation is performed. Further, the self-excited oscillation circuit oscillates naturally in correspondence with the motion of the resonance point caused by the temperature and external loads of the piezoelectric element 2, and therefore a frequency automated tracking circuit such as that of other excitation methods becomes unnecessary, and a simplification of the driver circuit is realized.

The present invention is characterized in that the booster voltage is not reduced by the selection circuit 15 in accordance with connecting the selection circuit 15 to the electrode of the face which is opposite the face of the electrode connected to the booster circuit 14, and this can be supplied to the piezoelectric element 2 with good efficiency. Further, provided that this type of idea is considered, the arrangement of the amplifier circuit 12 and the phase setting circuit 13 is arbitrary, and they may be formed anywhere. Furthermore, the structure is not limited to that of embodiment 1, and may be arbitrary.

Figure 5:
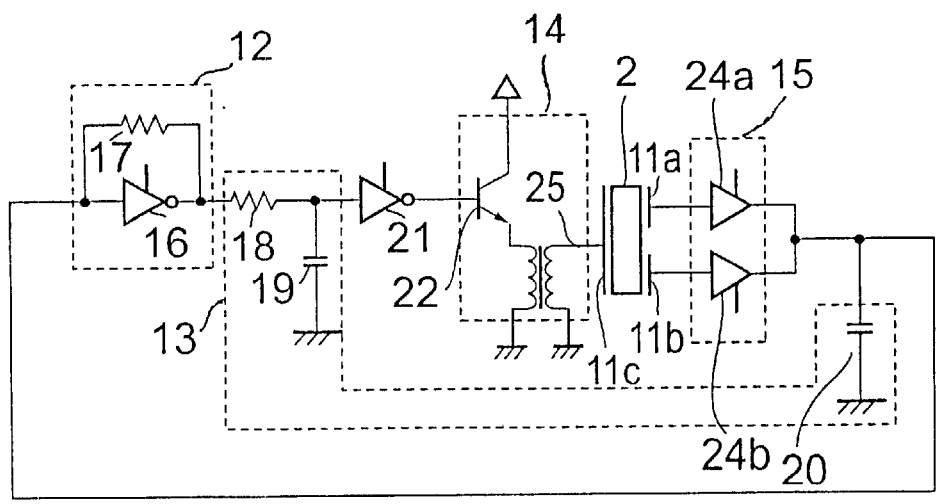
FIG. 5 shows a specific circuit structure of embodiment 1 of the ultrasonic motor of the present invention.

With the present invention, the booster circuit 14 is structured by the transistor 22 and the booster coil 23, but the effect is the same if a transformer 25 is used as a substitute for the booster coil 23. A circuit structure using the transformer 25 is shown in FIG. 5. The differences with FIG. 4 are that the position at which the transformer 25 is connected is the emitter side of the transistor 22, and that by using the transformer 25, there is a primary side and secondary side electrical insulator.

The collector of the transistor 22 is connected to the electric power supply voltage, the transistor 22 is placed in a conduction state by a signal input to the base, and the electric power supply voltage is applied to the primary side of the transformer 25 by the emitter. The same signal is input to GND via the transformer 25. By setting the signal input to the base of the transistor 22 to OFF, a counter electric voltage of several times the electric power supply voltage is generated in the secondary side, and the booster signal is applied to the common electrode 11c of the piezoelectric element 2.

Thus the booster circuit 14 has a similar, or larger, boosting effect when the transformer 25 is used, and it is possible to arbitrarily boost a voltage by the number of turns of the transformer 25.

Figure 6:
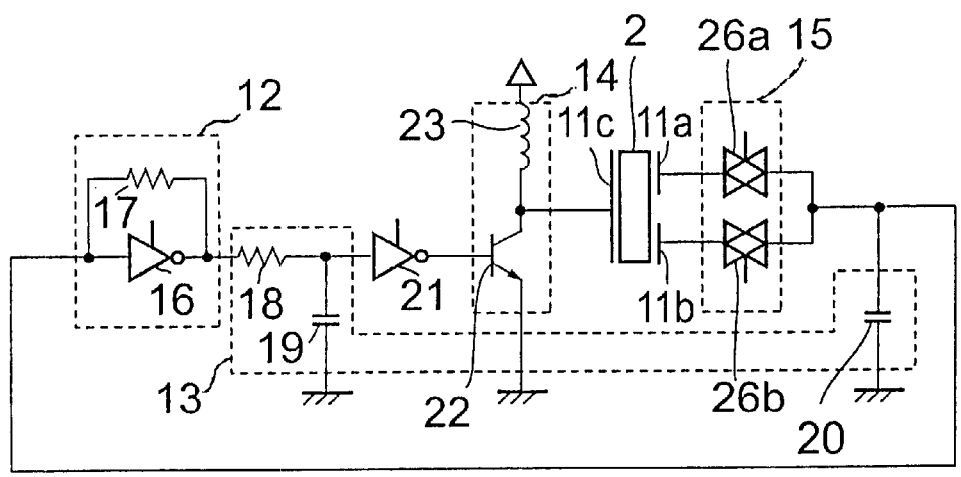
FIG. 6 shows a specific circuit structure of embodiment 1 of the ultrasonic motor of the present invention.
Figure 7:
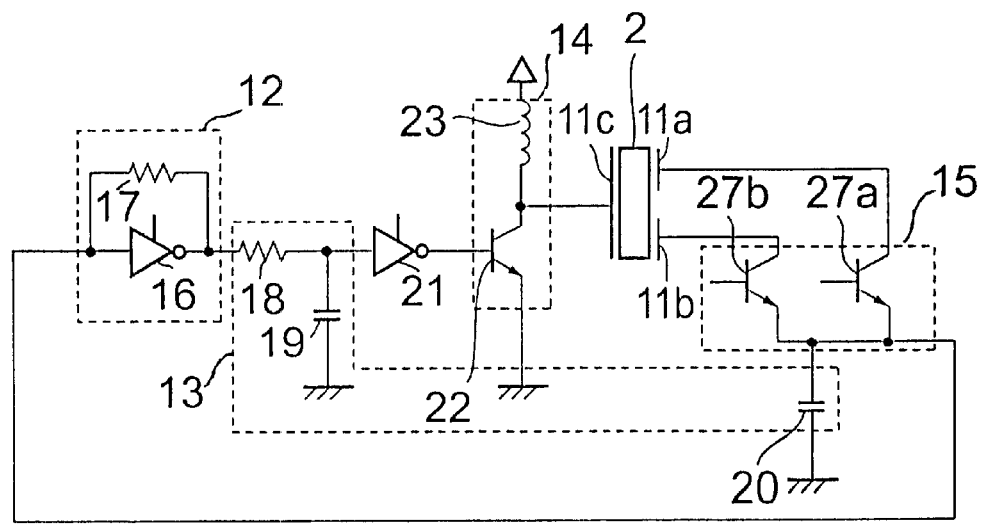
FIG. 7 shows a specific circuit structure of embodiment 1 of the ultrasonic motor of the present invention.
Figure 8:
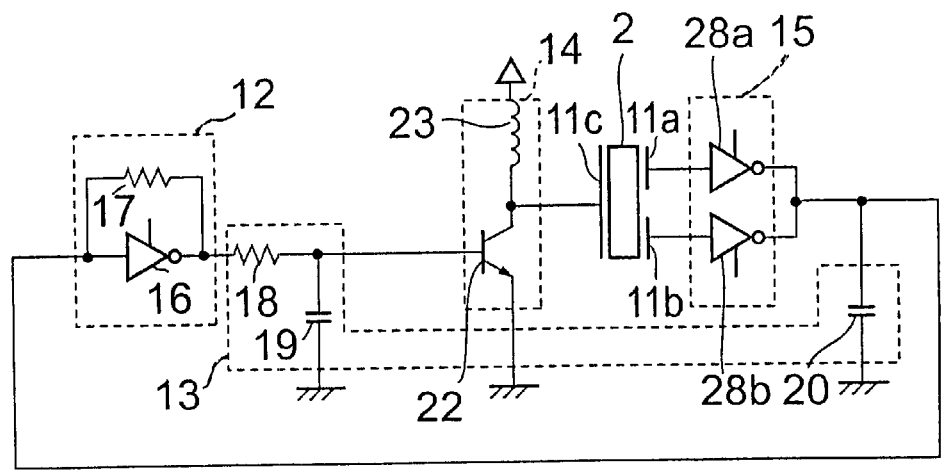
FIG. 8 shows a specific circuit structure of embodiment 1 of the ultrasonic motor of the present invention.

Furthermore, FIG. 6, FIG. 7, and FIG. 8 may also be used as other specific circuit structures. FIG. 6 is an embodiment using transmission gates in the selection circuit 15.

By inputting the control signal to control terminals of transmission gates 26a and 26b, the transmission gates 26a and 26b can be placed into an active state or an inactive state, and the direction of motion of the moving member 4 can be controlled. The transmission gate 23 in an active state does not amplify a signal, like an inverter or a buffer, and the voltage excited by the vibrating member 3 is applied to the capacitor 20.

FIG. 7 shows an embodiment in which the selection circuit 15 is structured by transistors. By inputting the control signal for selecting the direction of rotation to the base of transistors 27a and 27b, the rotation direction of the ultrasonic motor 1 can be selected. By applying the transistors, the voltage excited by the vibrating member 3 is sent through, similar to the transmission gates 26a and 26b. Further, the element voltage resistance for the transistor is extremely high compared to an IC such as an inverter or a buffer, and therefore it becomes possible to set the signal boosted by the booster circuit 14 to be high.

FIG. 8 is an embodiment in which the selection circuit 15 is structured by inverters 28a and 28b. By placing an inverter downstream in this manner, the phase is inverted by the selection circuit 15, and therefore it becomes possible to eliminate the inverter 21 used for phase regulation, heretofore necessary. In addition to reducing the number of parts, the entire amplifier circuit can be structured by inverters, and this also contributes to reducing the types of, parts. A reduction in the driver circuit can be realized by using this type of circuit structure.

As stated above, the signal boosted by the booster circuit 14 is input to the common electrode formed on one face of the piezoelectric element, is output from a plurality of electrode groups of the other side of the piezoelectric element 2 to the selection circuit 15 for selecting the switching of the signal, and by selecting this, it is possible to perform forward and reverse operation of the self-excited oscillation circuit using the booster circuit 14.

Embodiment 2

Figure 9:
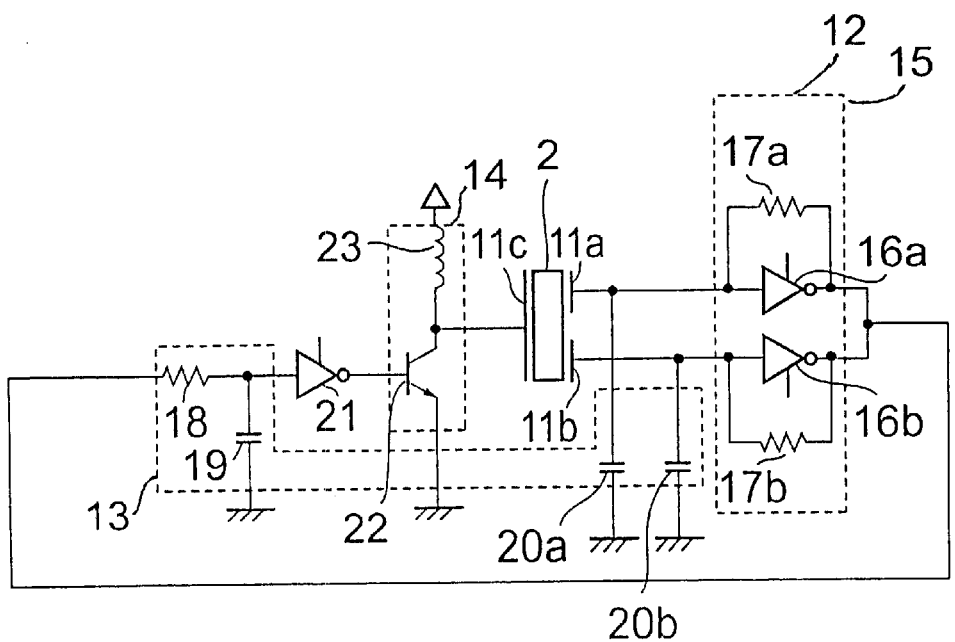
FIG. 9 shows a specific circuit structure of embodiment 2 of the ultrasonic motor of the present invention.

FIG. 9 shows a specific circuit structure of embodiment 2 of the present invention, and only the points of difference with the circuit structure of embodiment 1 are explained.

The selection circuit 15 for performing switching of the rotation direction signal has been connected directly to the plurality of electrode groups 11a and 11b of the piezoelectric element 2, but in embodiment 2, capacitors 20a and 20b which structure a phase setting circuit are inserted between these. Further, the selection circuit 15 is structured by the amplifier circuit 12 from the one group of the inverter 16 and the resistor 17. The feedback resistor 17 may also be formed in the inverter 21, not the inverter 16.

By inserting the capacitors 20a and 20b in one face of the piezoelectric element 2 on the side having the pluralities of electrode groups 11a and 11b, unneeded frequency components generated by the vibrating member are cut, and the oscillation signal and the oscillation waveform can be rectified. Signals capable of being applied to both ends of the piezoelectric element 2 become ideal driving signals having extremely few unintended frequency components, and the efficiency of the ultrasonic motor 1 is increased. Further, voltages generated from unused electrode groups not used in driving are relaxed, and harmful influence with respect to the amplifier circuit 16 in the inactive state is suppressed.

In embodiment 2, the capacitors 20a and 20b with the piezoelectric element 2 structuring a filter circuit are inserted, but a coil may also be well used provided that it structures a filter for suppressing high frequency components. In the case of a coil, it is connected in series with the amplifier circuit 16.

Although not shown in the figures, this effect can be increased by forming the resistor 18 between the inverter 16 and the capacitor 20.

By using this type of circuit structure, it is possible to obtain a self-excited oscillation circuit having extraordinarily strong oscillations, and furthermore, by using the inverter 16 structuring the amplifier circuit 12 in the selection circuit 15, it is possible to reduce the number of types of parts.

Figure 10:
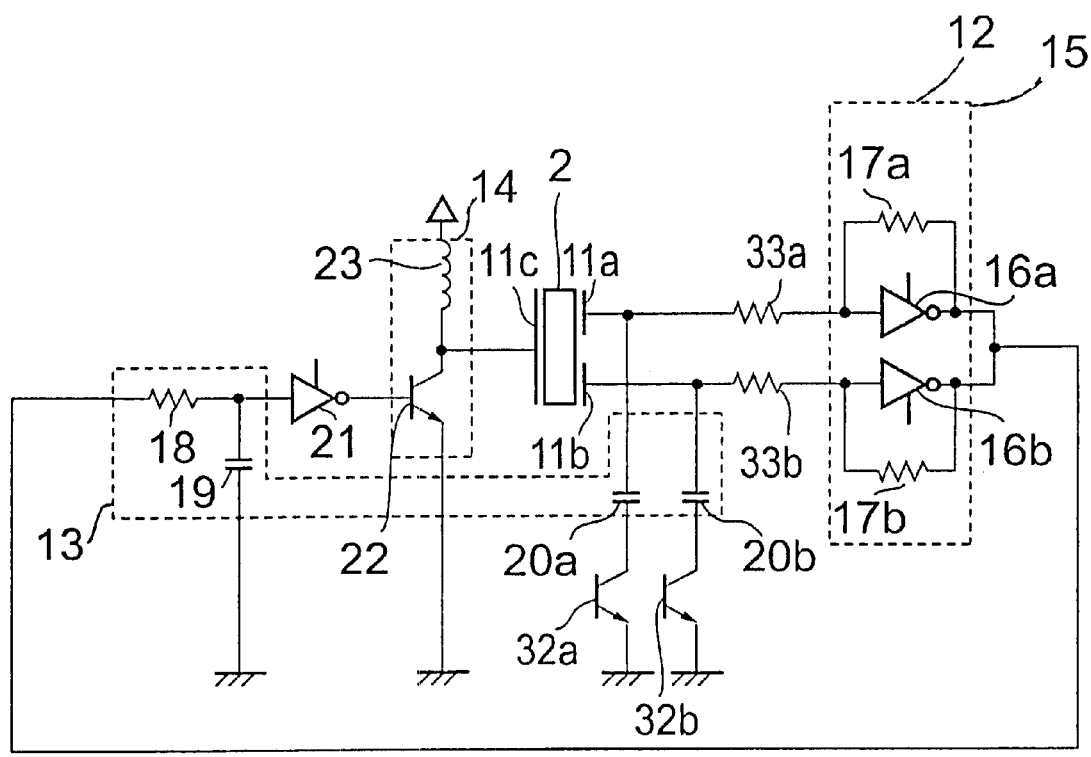
FIG. 10 shows a specific circuit structure of embodiment 2 of the ultrasonic motor of the present invention.

FIG. 10 is a example of a different form of the self-excited oscillation circuit shown in FIG. 9. Transistors 32a and 32b are formed between the capacitors 20a and 20b, and GND. By making an electric current flow in the bases of the transistors 32a and 32b, the capacitors 20a and 20b function as filters connected to ground. Therefore, the capacitors on the side structuring the self-excited oscillator circuit can be grounded, and consequently the capacitors do not have a harmful influence with respect to the signal output by the piezoelectric effect from the electrode, from among the electrodes 11a and 11b, not used in driving. Namely, there is no harmful influence on the vibrations of the piezoelectric element 2. Although not shown in the figures here, a method in which the other terminal of one of the capacitors connected to ground may be selectively connected to any of the electrodes 11a and 11b through switching means, such as a relay, may also be used.

In addition, resistors 33a and 33b are formed in the input stage of the inverters 16a and 16b. Similar to that stated above, a signal output from the electrode from among the electrodes 11a and 11b which is not used in driving can be prevented from influencing the inverter in the inactive state. The inverter in the inactive state can normally be regarded as being in a high impedance state, but when the voltage level of the signal output from the electrode not used in driving is high, this state collapses, and therefore this invites harmful influence to the oscillation signal along with harmful influence to the vibration of the piezoelectric element 2, there is the possibility of reducing the stability of the oscillations and the characteristics of the motor.

Figure 11:
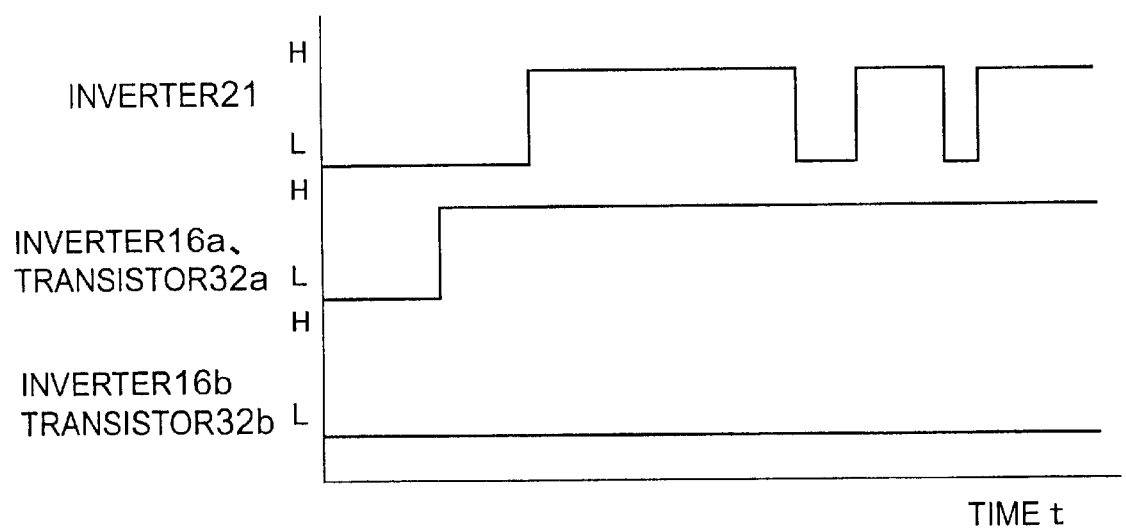
FIG. 11 shows a state of applying a control signal to a driver circuit of the ultrasonic motor of the present invention.

An actual method of driving is explained next using FIG. 11 as an example. FIG. 11 shows a state of applying a control signal to control terminals of the inverters 16a and 16b, and to the bases of the transistors 32a and 32b. First of all, a High level signal is input to the inverter 16a and the transistor 32a, and which of the electrodes 11a and 11b structures the self-excited oscillator circuit, namely which direction the moving member is rotating, is determined. Then, by inputting a High level signal to the control terminal of an inverter 21, oscillation is started. Next, by alternately inputting a short period, High/Low level signal to the control terminal of the inverter 21, for example, it becomes possible to have stepping motion.

By thus not simultaneously setting the plurality of switching means (the inverters 16a and 16b, and the transistors 32a and 32b here), which are capable of selecting whether the self-exciting oscillator circuit is in a driving state or a non-driving state, into the driving state, the amount of time until oscillation at a predetermined resonance mode begins is quickened, and stable oscillation becomes possible. For example, if the inverters 21 and 16a, and the transistors 32a are placed in the driving state at the same time, a large noise is generated, and a long amount of time is necessary until the oscillation begins at the frequency of the predetermined resonance mode, and depending upon the circumstances, abnormal oscillations are caused, and there are cases when driving cannot be done.

In particular, with the inverter 16a set into the driving state, by setting the inverter 21 into the driving state after the electric potential of the input stage of the inverter 16a reaches the operation point VDD/2, the amount of time until the oscillations begin can be quickened.

This type of control signal application is not limited to the self-excited oscillation circuit shown in embodiment 2, and of course a similar effect can also be obtained when applied to a self-excited oscillation circuit not having a booster circuit.

Embodiment 3

Figure 12:
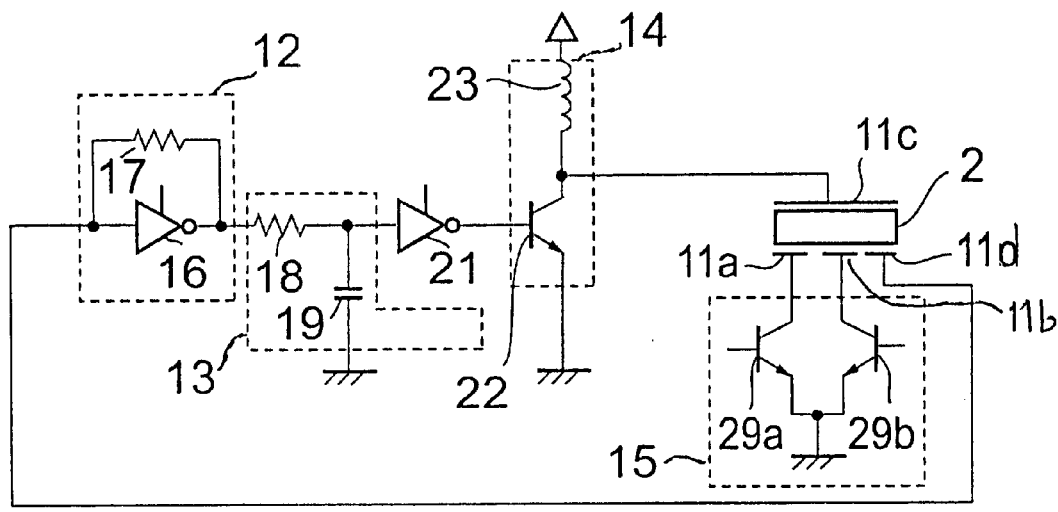
FIG. 12 shows a specific circuit structure of embodiment 3 of the ultrasonic motor of the present invention.

FIG. 12 shows a specific circuit structure of embodiment 3 of the present invention, and only points, which differ with the circuit structures of the above embodiments, are explained.

A signal inverted and boosted by the booster circuit is input to the common electrode 11c formed on one face of the piezoelectric element 2, and the signal excited by the vibrating body is output from a detecting electrode portion 11d for detecting a drive signal and which is formed in the other face of the piezoelectric element 2. The signal output from the detecting electrode portion 11d is fed back to the amplifier circuit 12.

Transistors 29a and 29b are used in the selection circuit 15 for selecting the rotation direction of the ultrasonic motor 1, and by inputting a control signal for selecting the direction of rotation into the base of the transistors 29a and 29b, the signal generated by the vibrating member flows in each transistor, and the same signal flows into GND. The signal output from the detecting electrode portion is always fed back to the amplifier circuit, regardless of rotation direction, and self-excitation is performed.

Figure 13:
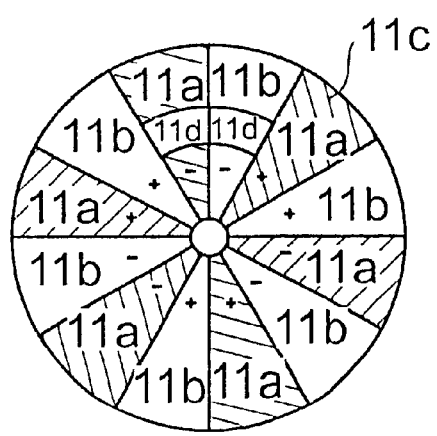
FIG. 13 shows an electrode pattern diagram of a piezoelectric element used in the ultrasonic motor of the present invention.

The detecting electrode portion 11d is shown in FIG. 13. The detecting electrode portion 11d is formed on the same side as the first electrode group 11a and the second electrode group 11b. For example, for a case of utilizing the second oscillation mode in the radial direction, by forming the detecting electrode portion 11d in a position on the peak having the largest amplitude of the displacement of the piezoelectric element 2, as in the figure, a driving signal having the main frequency components, and with few unnecessary frequency components, can be detected.

Embodiment 4

Figure 14:
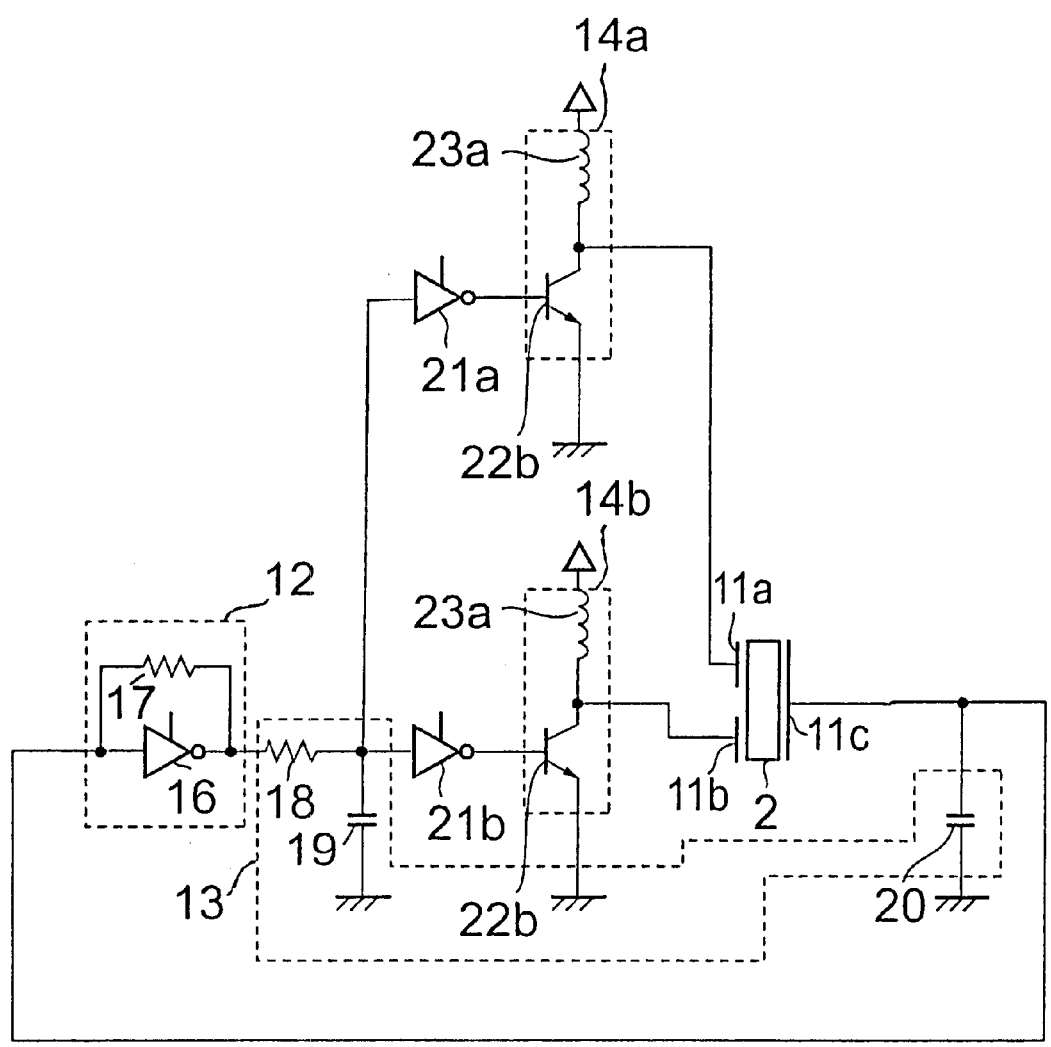
FIG. 14 shows a specific circuit structure of embodiment 4 of the ultrasonic motor of the present invention.

FIG. 14 shows a specific circuit diagram of embodiment 4 of the present invention. A structure is used in which output from two booster circuits composed of transistors 22a and 22b, and coils 23a and 23b, can be supplied to the electrodes 11a and 11b. With this output signal it is possible to select which booster circuit is set into the active state, and which is set into the inactive state, in accordance with output signal switching means composed of three state inverters 21a and 21b. In other words, if the signal is output from the inverter, from among the inverters 21a and 21b, which becomes active, then the signal from the booster circuit connected to the inverter is output to the electrode. In this case the insulating strength of the transistor is high in comparison with parts such as inverters, and therefore it is difficult to be influenced by the signal output from the electrode not used in driving, and the ultrasonic motor can be driven at high power.

A structure having the output signal switching means capable of selecting which of the plurality of booster circuits may be made capable of outputting is used here, but a structure having output signal switching means capable of selecting which electrode one booster circuit to supply this output may also be used. For example, a method may be used for selecting the output electrode of the booster signal by which a part such as a relay becomes an output signal switching means, and two relays are formed between each two electrodes and one booster circuit. In this case the insulating strength of the relays is extremely high, and therefore there is hardly any influence from the signal output from the electrode not used in driving, and the ultrasonic motor can be driven at high power.

Embodiment 5

Figure 15:
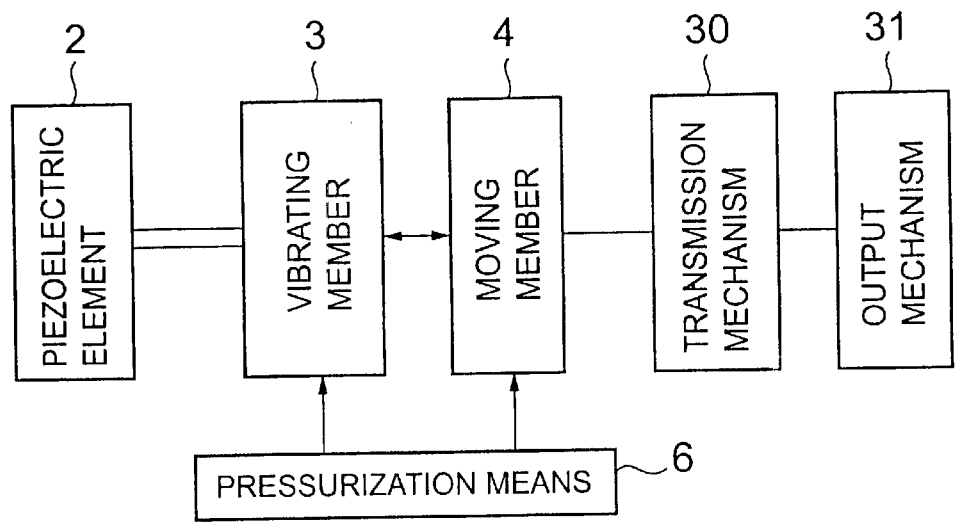
FIG. 15 is a block diagram showing an example of applying an ultrasonic motor relating to the present invention in an electronic device.
Figure 16:
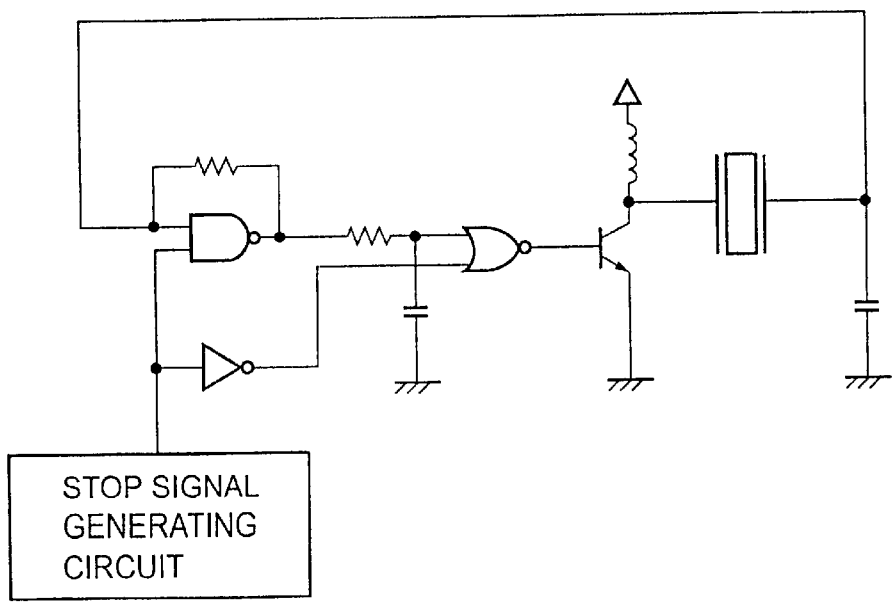
FIG. 16 shows an example of a self-excited oscillation circuit of a conventional ultrasonic motor.

FIG. 15 shows a block diagram of the ultrasonic motor 1 of the present invention being applied as a drive source to an electronic device, and is an electronic device having an ultrasonic motor structured by the piezoelectric element 2, the vibrating member 3, the pressurization means 6, the moving member 4, a transmission mechanism 30, and an output mechanism 31. Embodiment 5 is structured from the piezoelectric element 2, the vibrating body 3 contacting the piezoelectric element 2, the moving member 3 which periodically applies pressure to the vibrating member 3, the output mechanism 31 capable of moving based on the operation of the transmission means 30 which operates in unity with the moving member 3, and the pressurization mechanism 6 which applies pressure to the moving member 4.

A transmission gear such as a gear array or a friction wheel, for example, is used for the transmission mechanism 30 here. The output mechanism 31 uses a paper feeding mechanism in a printer; a shutter drive mechanism, a lens drive mechanism, or a film winding mechanism or the like in a camera; the hands in an electronic clock or measurement device; an arm mechanism in a robot; or a gear advancing mechanism or a processing member advancing mechanism in a machine tool.

Note that, as the electronic device in embodiment 5, an electronic clock, a measuring device, a camera, a printer, a printing machine, a robot, a machine tool, a game machine, and a moving device or the like can be realized. In addition, if a structure having an output shaft formed in the moving member, and a power transmission mechanism for transmitting torque from the output axis is used, an ultrasonic motor driven device can be realized.

EFFECT OF THE INVENTION

The present invention is structured by an ultrasonic motor composed of a vibrating member having a piezoelectric element and an oscillator circuit for self-excited oscillation of the vibrating member at a predetermined resonance mode, and which drives a moving member by an oscillatory wave generated in the vibrating member, a booster circuit for boosting an electric voltage generated by an amplifier circuit, and outputting a signal to a common electrode formed on one face of the piezoelectric element, and a selection circuit for switching a signal path of a booster signal output from a plurality of electrode groups formed on another face of the piezoelectric element. The signal generated by the booster circuit is output to the common electrode formed on one face of the piezoelectric element, and the booster signal input to the common electrode is output from the plurality of electrode groups formed on the other face to the selection circuit for switching the signal path, and it thus becomes possible to control forward and reverse rotation directions by one set of booster circuits. An increase in the number of parts is therefore suppressed, and a self-excited drive circuit capable of forward and reverse operation can be realized using a booster circuit, and an electronic device having an ultrasonic motor can be provided.

What is claimed is:

1. An ultrasonic motor comprising: a piezoelectric element having a plurality of electrode groups formed on one surface and a common electrode formed on another surface for vibrating in response to a drive signal applied between at least one of the plurality of electrode groups and the common electrode; a vibrating member in contact with the piezoelectric element; an amplifier circuit for amplifying an output signal of a selected one of the electrode groups; a booster circuit for boosting an output signal of the amplifier circuit and supplying a boosted output signal to the common electrode; and a selection circuit for selecting one of the plurality of electrode groups and outputting a signal from the selected electrode group to the amplifier circuit.

2. An ultrasonic motor according to claim 1; wherein the booster circuit comprises at least one set consisting of a coil and a transistor.

3. An ultrasonic motor according to claim 1; wherein the booster circuit comprises at least one set consisting of a transformer and a transistor.

4. An ultrasonic motor according to claim 1; wherein the selection circuit has at least one set of amplifier circuits.

5. An ultrasonic motor according to claim 1; further comprising a filter circuit arranged between the plurality of electrode groups of the piezoelectric element and the selection circuit.

6. An ultrasonic motor according to claim 5; wherein the filter circuit is selectable by an external command signal.

7. An ultrasonic motor according to claim 1; wherein one of the plurality of electrode groups comprises a detection electrode for detecting a drive signal based on vibration of the piezoelectric element and outputting a detection signal to the amplifier circuit.

8. An ultrasonic motor according to claim 7; wherein the selection circuit selectively short-circuits the plurality of electrode groups to GND.

9. An electronic device comprising: an ultrasonic motor according to claim 1; a moving member driven by the vibrating member; a transmission mechanism driven by the moving member; and an output mechanism driven by the transmission mechanism.

10. An ultrasonic motor according to claim 1; further comprising a phase setting circuit for extracting a predetermined frequency from an output signal of the amplifying circuit to control a phase thereof.

11. An electronic device comprising: an ultrasonic motor according to claim 10; a moving member driven by the vibrating member; a transmission mechanism driven by the moving member; and an output mechanism driven by the transmission mechanism.

12. An ultrasonic motor according to claim 1; wherein the selection circuit changes a direction of rotation of the ultrasonic motor by selecting an output signal of one of the plurality of electrode groups.

13. An ultrasonic motor according to claim 12; wherein the selection circuit comprises a plurality of buffers each connected to an output of one of the plurality of electrode groups.

14. An ultrasonic motor according to claim 13; wherein the selection circuit changes a direction of rotation of the ultrasonic motor by selecting which buffer to place in an active state based on an external control signal.

15. An ultrasonic motor comprising: a vibrating member having a piezoelectric element; an oscillator circuit which is self-excited by a predetermined resonance mode of the vibrating member and has a plurality of switching elements for selecting a driving state and a non-driving state; and an amplifier circuit for amplifying an output signal of the oscillator circuit; wherein plural switching elements of the oscillator circuit must be activated to cause the oscillator circuit to oscillate and change the ultrasonic motor from the non-driving state to the driving state, and the plural switching elements are controlled so that one of the switching elements is activated to place the motor in the driving state and other switching elements are activated a predetermined time thereafter to place the motor into the driving state.

16. An electronic device comprising: an ultrasonic motor according to claim 15; a moving member driven by the vibrating member; a transmission mechanism driven by the moving member; and an output mechanism driven by the transmission mechanism.

17. An ultrasonic motor comprising: a vibrator having a piezoelectric element with a plurality of electrode groups formed on a first surface for driving the piezoelectric element, a detection electrode formed on the first surface for detecting a driving signal based on vibration of the piezoelectric element produced by the electrode groups and outputting a detection signal, and a common electrode formed on a second surface of the piezoelectric element, the vibrator undergoing vibration in accordance with a drive signal applied between at least one of the plurality of electrode groups and the common electrode; a booster circuit for boosting the detection signal and outputting a boosted signal to the common electrode; and a selection circuit for selecting an output signal from one of the plurality of electrode groups to control a direction of the motor and supplying the selected output signal to ground.

18. An ultrasonic motor according to claim 17; further comprising an amplifier circuit interposed between the detection electrode and the booster circuit for amplifying the detection signal and supplying an amplified signal to the booster circuit.

* * * * *